US012617895B2

(12) United States Patent
Xiong et al.

(10) Patent No.: US 12,617,895 B2
(45) Date of Patent: May 5, 2026

(54) RESIN COMPOSITION AND ARTICLE MADE THEREFROM

(71) Applicant: Elite Electronic Material (Zhongshan) Co., Ltd., Zhongshan City (CN)

(72) Inventors: Xiang Xiong, Zhongshan City (CN); Zhilong Hu, Zhongshan City (CN); Weiliang Chen, Zhongshan City (CN); Yaoqiang Ming, Zhongshan City (CN)

(73) Assignee: ELITE ELECTRONIC MATERIAL (ZHONGSHAN) CO., LTD., Zhongshan City (CN)

( * ) Notice: Subject to any disclaimer, the term of this patent is extended or adjusted under 35 U.S.C. 154(b) by 654 days.

(21) Appl. No.: 17/994,933

(22) Filed: Nov. 28, 2022

(65) Prior Publication Data

US 2024/0158576 A1 May 16, 2024

(30) Foreign Application Priority Data

Oct. 25, 2022 (CN) ......................... 202211316265.3

(51) Int. Cl.

| | |
|---|---|
| ***C08G 65/48*** | (2006.01) |
| ***B32B 15/08*** | (2006.01) |
| ***B32B 15/20*** | (2006.01) |
| ***C08G 73/10*** | (2006.01) |
| ***C08J 5/18*** | (2006.01) |
| ***C08J 5/24*** | (2006.01) |
| ***C08K 5/105*** | (2006.01) |
| ***C08K 5/521*** | (2006.01) |
| ***C08K 5/523*** | (2006.01) |
| ***C08L 71/12*** | (2006.01) |

(52) U.S. Cl.

CPC ............ *C08G 65/485* (2013.01); *B32B 15/08* (2013.01); *B32B 15/20* (2013.01); *C08G 73/10* (2013.01); *C08J 5/18* (2013.01); *C08J 5/24* (2013.01); *C08J 5/244* (2021.05); *C08J 5/249* (2021.05); *C08K 5/105* (2013.01); *C08K 5/521* (2013.01); *C08K 5/523* (2013.01); *C08L 71/12* (2013.01); *C08L 71/126* (2013.01); *B32B 2250/03* (2013.01); *B32B 2250/40* (2013.01); *B32B 2311/12* (2013.01); *B32B 2457/08* (2013.01); *C08G 2650/04* (2013.01); *C08J 2371/12* (2013.01); *C08L 2201/02* (2013.01)

(58) Field of Classification Search

CPC ...... C08L 71/126; C08L 67/03; C08L 79/085; C08L 79/08; C08K 5/523; C08K 7/18

See application file for complete search history.

(56) References Cited

U.S. PATENT DOCUMENTS

2011/0120761 A1* 5/2011 Kawai ..................... C08L 63/00 525/472
2020/0071477 A1* 3/2020 Liu ...................... C08K 5/0066
2023/0399511 A1* 12/2023 Umehara ................. C08J 5/249

FOREIGN PATENT DOCUMENTS

WO WO-2022054861 A1 * 3/2022 ............... C08K 3/36

* cited by examiner

*Primary Examiner* — Marc S Zimmer
*Assistant Examiner* — Virginia L Stonehocker
(74) *Attorney, Agent, or Firm* — Muncy, Geissler, Olds & Lowe, P.C.

(57) ABSTRACT

A resin composition includes 100 parts by weight of a vinyl group-containing polyphenylene ether resin, 5 parts by weight to 30 parts by weight of a maleimide resin, 5 parts by weight to 40 parts by weight of an active ester and 5 parts by weight to 40 parts by weight of a phosphate ester, wherein the resin composition does not include an epoxy resin. Moreover, also provided is an article made from the resin composition, including a prepreg, a resin film, a laminate or a printed circuit board, and the various properties can be improved including dissipation factor, dissipation factor after thermal aging, dissipation factor variation rate after thermal aging, copper foil peeling strength and alkali resistance.

12 Claims, No Drawings

RESIN COMPOSITION AND ARTICLE MADE THEREFROM

CROSS-REFERENCE TO RELATED APPLICATION

This application claims the priority benefits of China Patent Application No. 202211316265.3, filed on Oct. 25, 2022. The entirety the above-mentioned patent application is hereby incorporated by reference herein and made a part of this specification.

BACKGROUND

1. Field of the Disclosure

The present disclosure mainly relates to a resin composition, more particularly to a resin composition useful for preparing a prepreg, a resin film, a laminate or a printed circuit board.

2. Description of Related Art

Recently, the electronic technology has been developed towards higher density, lower power consumption and higher performance, thereby presenting more challenges to the high performance electronic materials.

With the intellectualized development of electronic products, the amount of signals that need to be processed is getting larger, and the speed is getting faster. The requirements for signal transmission loss are becoming more and more stringent, especially for 5G base stations and network communication terminals, etc. The high-frequency printed circuit boards (PCBs) used for these equipment rely more and more on copper-clad laminate materials to overcome such problems, which not only presents demands on thermal resistance and electrical properties of the materials, but also presents demands on the performance after thermal aging. Accordingly, inventors have carried out related researches on copper-clad laminate materials.

SUMMARY

To overcome the problems of prior arts, particularly one or more above-mentioned technical problems facing conventional materials, it is a primary object of the present disclosure to provide a resin composition and an article made therefrom which may overcome at least one of the above-mentioned technical problems.

To achieve the above-mentioned object, the present disclosure provides a resin composition, comprising 100 parts by weight of a vinyl group-containing polyphenylene ether resin, 5 parts by weight to 30 parts by weight of a maleimide resin, 5 parts by weight to 40 parts by weight of an active ester and 5 parts by weight to 40 parts by weight of a phosphate ester, wherein the resin composition does not comprise an epoxy resin.

For example, in one embodiment, the vinyl group-containing polyphenylene ether resin comprises a vinylbenzyl group-terminated polyphenylene ether resin, a methacrylate group-terminated polyphenylene ether resin, an allyl group-terminated polyphenylene ether resin or a combination thereof.

For example, in one embodiment, the maleimide resin comprises 4,4'-diphenylmethane bismaleimide, polyphenylmethane maleimide, 2,2'-bis-[4-(4-maleimidephenoxy)phenyl]propane, m-phenylene bismaleimide, bisphenol A diphenyl ether bismaleimide, 3,3'-dimethyl-5,5'-diethyl-4,4'-diphenyl methane bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenyl maleimide, maleimide resin containing aliphatic long-chain structure or a combination thereof.

For example, in one embodiment, the active ester has a structure of Formula (I):

Formula (I)

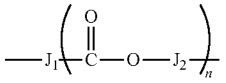

wherein $J_1$ and $J_2$ each independently comprise an arylene group, and n is an integer of 1 to 30.

For example, in one embodiment, the phosphate ester comprises resorcinol bis-(diphenyl phosphate), hydroquinone bis-(dixylenyl phosphate), bisphenol A bis-(diphenyl phosphate), resorcinol bis-(dixylenyl phosphate), biphenol bis-(dixylenyl phosphate) or a combination thereof.

For example, in one embodiment, the resin composition further comprises a maleimide triazine resin, an unsaturated polyolefin resin, a hydrogenated unsaturated polyolefin resin, a small molecule vinyl group-containing resin, a styrene maleic anhydride resin, a phenolic resin, a benzoxazine resin, a cyanate ester resin, a polyamide resin, a polyimide resin or a combination thereof.

For example, in one embodiment, the resin composition further comprises amine curing agent, inorganic filler, curing accelerator, polymerization inhibitor, coloring agent, solvent, toughening agent, silane coupling agent or a combination thereof.

Another main object of the present disclosure is to provide an article made from the aforesaid resin composition, comprising a prepreg, a resin film, a laminate or a printed circuit board.

For example, in one embodiment, articles made from the resin composition disclosed herein have one, more or all of the following properties:

- a dielectric constant at 10 GHz as measured by reference to JIS C2565 of less than or equal to 3.40;
- a dissipation factor at 10 GHz as measured by reference to JIS C2565 of less than or equal to 0.00210;
- a dielectric constant at 10 GHz as measured by reference to JIS C2565 after being subject to 96 hours of aging at 188° C. of less than or equal to 3.41;
- a dissipation factor at 10 GHz as measured by reference to JIS C2565 after being subject to 96 hours of aging at 188° C. of less than or equal to 0.00369;
- a dielectric constant variation rate at 10 GHz as calculated after being subject to 96 hours of aging at 188° C. of less than or equal to 0.29%;
- a dissipation factor variation rate at 10 GHz as calculated after being subject to 96 hours of aging at 188° C. of less than or equal to 86.53%;
- a glass transition temperature as measured by using a thermal mechanical analyzer by reference to IPC-TM-650 2.4.24.5 of greater than or equal to 170° C.;
- a copper foil peeling strength as measured by reference to IPC-TM-650 2.4.8 of greater than or equal to 3.00 lb/in;
- a copper foil peeling strength as measured by reference to IPC-TM-650 2.4.8 of greater than or equal to 3.00 lb/in after thermal treatment performed by reference to IPC-TM-650 2.6.27;

an alkali resistance as measured from an NaOH alkali resistance test of greater than or equal to 4.0 minutes;

no delamination occurs after subjecting the article to a pressure cooking test by reference to IPC-TM-650 2.6.16.1 followed by a thermal resistance test by reference to IPC-TM-650 2.4.23; and a time to delamination as measured by reference to IPC-TM-650 2.4.23 in a time to delamination test of greater than 15 minutes.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "includes," "including," "has," "having," "encompasses," "encompassing," or any other variant thereof is construed as an open-ended transitional phrase intended to cover a non-exclusive inclusion. For example, a composition or article of manufacture that comprises a list of elements is not necessarily limited to only those elements but may include other elements not expressly listed or inherent to such composition or article of manufacture. Further, unless expressly stated to the contrary, the term "or" refers to an inclusive or and not to an exclusive or. For example, a condition "P or Q" is satisfied by any one of the following: P is true (or present) and Q is false (or not present), P is false (or not present) and Q is true (or present), and both P and Q are true (or present). In addition, whenever open-ended transitional phrases are used, such as "comprises," "comprising," "includes," "including," "encompasses," "encompassing," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Similarly, a range of "between 1 and 8" should be understood as explicitly disclosing all ranges such as 1 to 8, 1 to 7, 2 to 8, 2 to 6, 3 to 6, 4 to 8, 3 to 8 and so on and encompassing the end points of the ranges. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of X1, X2 and X3," it is intended to disclose the situations of X is X1 and X is X1 and/or X2 and/or X3. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of X1, X2 and X3" and Y is described as being "selected from a group consisting of Y1, Y2 and Y3," the disclosure includes any combination of X is X1 or X2 or X3 and Y is Y1 or Y2 or Y3. As used herein, "or a combination thereof" means "or any combination thereof".

Unless otherwise specified, the term "resin" is a widely used common name of a synthetic polymer and is construed in the present disclosure as comprising monomer and its combination, polymer and its combination or a combination of monomer and its polymer, but not limited thereto. For example, in the present disclosure, the term "maleimide resin" is construed to encompass a maleimide monomer (a small molecule compound of maleimide), a maleimide polymer, a combination of maleimide monomers, a combination of maleimide polymers, and a combination of maleimide monomer(s) and maleimide polymer(s).

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property. In addition, as used herein, a mixture may include two or more compounds and may include a copolymer or auxiliaries, but not limited thereto.

Unless otherwise specified, according to the present disclosure, a polymer refers to the product formed by monomer(s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, etc., but not limited thereto.

A homopolymer refers to a chemical substance formed by a single compound via polymerization, addition polymerization or condensation polymerization. A copolymer refers to a chemical substance formed by two or more compounds via polymerization, addition polymerization or condensation polymerization and may comprise: random copolymers, such as a structure of -AABABBBAAABBA-; alternating copolymers, such as a structure of -ABABABAB-; graft copolymers, such as a structure of -AA(A-BBBB)AA(A-BBBB)AAA-; and block copolymers, such as a structure of -AAAAA-BBBBBB-AAAAA-. Unless otherwise specified, according to the present disclosure, the prepolymer refers to a polymer having a lower molecular weight between the molecular weight of monomer and the molecular weight of final polymer, and the prepolymer contains a reactive functional group capable of participating further polymerization to obtain the final polymer product which has been fully crosslinked or cured.

The term "polymer" includes but is not limited to an oligomer. An oligomer refers to a polymer with 2-20, typically 2-5, repeating units.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from homopolymerizing a resin, a product derived from copolymerizing a resin and other resins, etc. For example, such as but not limited thereto, a modification may refer to replacing a hydroxyl group with a vinyl group via a chemical reaction, or obtaining a terminal hydroxyl group from a chemical reaction of a terminal vinyl group and p-aminophenol.

Unless otherwise specified, an alkyl group, an alkenyl group and a hydrocarbyl group described herein are construed to encompass various isomers thereof. For example, a propyl group is construed to encompass n-propyl and iso-propyl.

Unless otherwise specified, as used herein, "vinyl group-containing" refers to the presence of an ethylenic carbon-carbon double bond (C═C) or a functional group derived therefrom in a compound. Therefore, examples of "vinyl group-containing" may include, but not limited to, a structure containing a vinyl group, an allyl group, a vinylbenzyl group, a methacrylate group or the like. Unless otherwise specified, the position of the aforesaid functional group is not particularly limited and may be located at the terminal of a long-chain structure. Therefore, for example, a vinyl group-containing polyphenylene ether resin represents a polyphenylene ether resin containing a vinyl group, an allyl group, a vinylbenzyl group, a methacrylate group or the like, but not limited thereto.

The unsaturated bond described herein, unless otherwise specified, refers to a reactive unsaturated bond, such as but not limited to an unsaturated double bond with the potential of being crosslinked with other functional groups, such as an unsaturated carbon-carbon double bond with the potential of being crosslinked with other functional groups, but not limited thereto.

As used herein, part(s) by weight represents weight part(s) in any weight unit, such as but not limited to kilogram, gram, pound and so on. For example, 100 parts by weight of a vinyl group-containing polyphenylene ether resin may represent 100 kilograms of the vinyl group-containing polyphenylene ether resin or 100 pounds of the vinyl group-containing polyphenylene ether resin.

The following embodiments and examples are illustrative in nature and are not intended to limit the present disclosure and its application. In addition, the present disclosure is not bound by any theory described in the background and summary above or the following embodiments or examples. Unless otherwise specified, processes, reagents and conditions described in the examples are those known in the art.

As described above, the primary object of the present disclosure is to provide a resin composition, comprising 100 parts by weight of a vinyl group-containing polyphenylene ether resin, 5 parts by weight to 30 parts by weight of a maleimide resin, 5 parts by weight to 40 parts by weight of an active ester and 5 parts by weight to 40 parts by weight of a phosphate ester, wherein the resin composition does not comprise an epoxy resin.

For example, in one embodiment, the vinyl group-containing polyphenylene ether resin used herein refers to a polyphenylene ether compound or mixture having an ethylenic carbon-carbon double bond (C═C) or a functional group derived therefrom. Examples of the ethylenic carbon-carbon double bond (C═C) or the functional group derived therefrom may include, but not limited to, a structure containing a vinyl group, a vinylene group, an allyl group, a vinylbenzyl group, a methacrylate group or the like. Unless otherwise specified, the position of the aforesaid functional group is not particularly limited and may be located at the terminal of a long-chain structure. In other words, in the present disclosure, for example, the vinyl group-containing polyphenylene ether resin represents a polyphenylene ether resin containing a reactive vinyl group or a functional group derived therefrom, examples including but not limited to a polyphenylene ether resin containing a vinyl group, a vinylene group, an allyl group, a vinylbenzyl group, or a methacrylate group.

For example, in one embodiment, the vinyl group-containing polyphenylene ether resin described herein comprises a vinylbenzyl group-terminated polyphenylene ether resin, a methacrylate group-terminated polyphenylene ether resin (i.e., methacryl group-terminated polyphenylene ether resin), an allyl group-terminated polyphenylene ether resin or a combination thereof.

For example, the vinylbenzyl group-terminated polyphenylene ether resin and the methacrylate group-terminated polyphenylene ether resin respectively comprise a structure of Formula (II) and a structure of Formula (III):

Formulla (II)

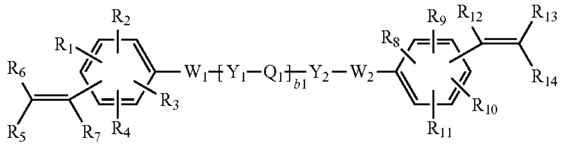

Formula (III)

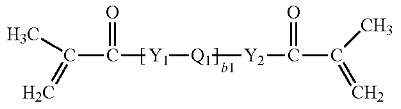

wherein $R_1$ to $R_{14}$ are individually H or —$CH_3$, and $W_1$ and $W_2$ are individually a $C_1$ to $C_3$ bivalent aliphatic group;

b1 is an integer of 0 to 8;

$Q_1$ comprises a structure of any one of Formula (B-1) to Formula (B-3) or a combination thereof:

Formula (B-1)

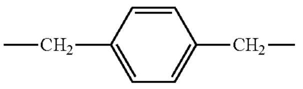

Formula (B-2)

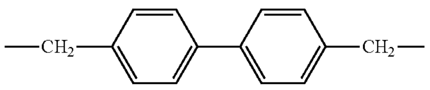

Formula (B-3)

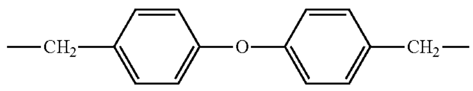

$Y_1$ and $Y_2$ independently comprise a structure of Formula (B-4):

Formula (B-4)

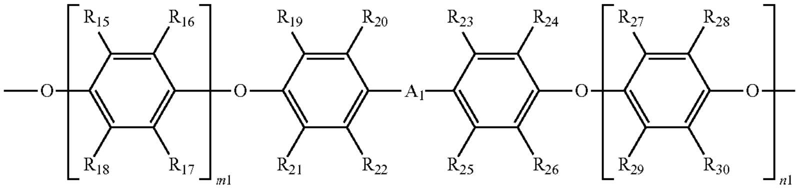

wherein $R_{15}$ to $R_{30}$ are independently H or —$CH_3$; m1 and n1 independently represent an integer of 1 to 30; and $A_1$ is selected from a covalent bond, —$CH_2$—, —$CH(CH_3)$—, —$C(CH_3)_2$—, —O—, —S—, —$SO_2$— and a carbonyl group.

For example, the vinyl group-containing polyphenylene ether resin may be SA9000 available from Sabic, a vinylbenzyl group-containing polyphenylene ether resin with a number average molecular weight of about 1200 (such as OPE-2st 1200, available from Mitsubishi Gas Chemical Co., Inc.), a vinylbenzyl group-containing polyphenylene ether resin with a number average molecular weight of about 2200 (such as OPE-2st 2200, available from Mitsubishi Gas Chemical Co., Inc.), a vinylbenzyl group-modified bisphenol A polyphenylene ether resin with a number average molecular weight of about 2400 to 2800, a chain-extended vinyl group-containing polyphenylene ether resin with a number average molecular weight of about 2200 to 3000, or a combination thereof. The chain-extended vinyl group-containing polyphenylene ether resin may include various polyphenylene ether resins disclosed in the US Patent Application Publication No. 2016/0185904 A1, all of which are incorporated herein by reference in their entirety.

For example, in one embodiment, the maleimide resin used herein refers to a compound or a mixture containing at least one maleimide group. Unless otherwise specified, the maleimide resin used in the present disclosure is not particularly limited and may include any one or more maleimide resins useful for preparing a prepreg, a resin film, a laminate or a printed circuit board. Examples include but are not limited to 4,4'-diphenylmethane bismaleimide, polyphenylmethane maleimide, 2,2'-bis-[4-(4-maleimidephenoxy) phenyl]propane, m-phenylene bismaleimide, bisphenol A diphenyl ether bismaleimide, 3,3'-dimethyl-5,5'-diethyl-4,4'-diphenyl methane bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenyl maleimide, maleimide resin containing aliphatic long-chain structure or a combination thereof. In addition, unless otherwise specified, the aforesaid maleimide resin of the present disclosure may also comprise a prepolymer thereof, such as a prepolymer of diallyl compound and maleimide resin, a prepolymer of diamine and maleimide resin, a prepolymer of multi-functional amine and maleimide resin or a prepolymer of acid phenol compound and maleimide resin, but not limited thereto.

For example, the maleimide resin may include products such as BMI-1000, BMI-1000H, BMI-1100, BMI-1100H, BMI-2000, BMI-2300, BMI-3000, BMI-3000H, BMI-4000H, BMI-5000, BMI-5100, BM-7000 and BMI-7000H available from Daiwakasei Industry Co., Ltd., products such as BMI-70 and BMI-80 available from K.I Chemical Industry Co., Ltd, or products such as D928, D930, D932, D934, D936, D937 and D938 available from Sichuan EM Technology Co., Ltd.

For example, the maleimide resin containing aliphatic long-chain structure may include products such as BMI-689, BMI-1400, BMI-1500, BMI-1700, BMI-2500, BMI-3000 and BMI-5000 available from Designer Molecules Inc. For example, the maleimide resin containing aliphatic long chain structure may have at least one maleimide group bonded with a substituted or unsubstituted long-chain aliphatic group. The long-chain aliphatic group may be a $C_5$ to $C_{50}$ aliphatic group, such as $C_{10}$ to $C_{50}$, $C_{20}$ to $C_{50}$, $C_{30}$ to $C_{50}$, $C_{20}$ to $C_{40}$ or $C_{30}$ to $C_{40}$, but not limited thereto. Examples of commercial maleimide resins containing aliphatic long-chain structure include:

BMI-689

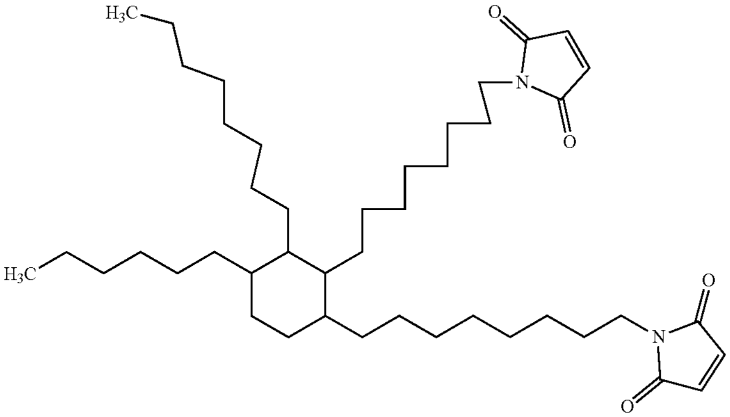

-continued
BMI-1400
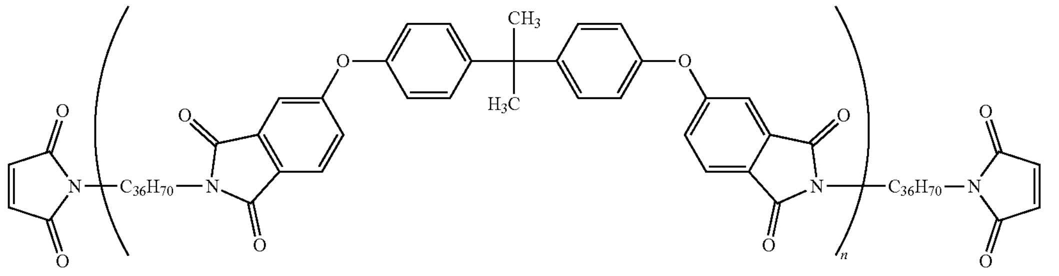
Where n = 1 to 10
BMI-1500
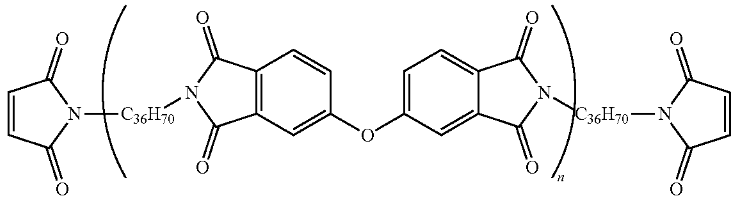
Average n = 1.3
BMI-1700
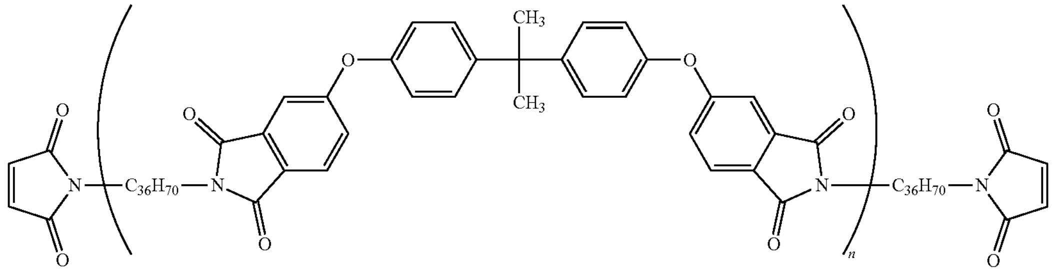
Where n = 1 to 10
BMI-2500
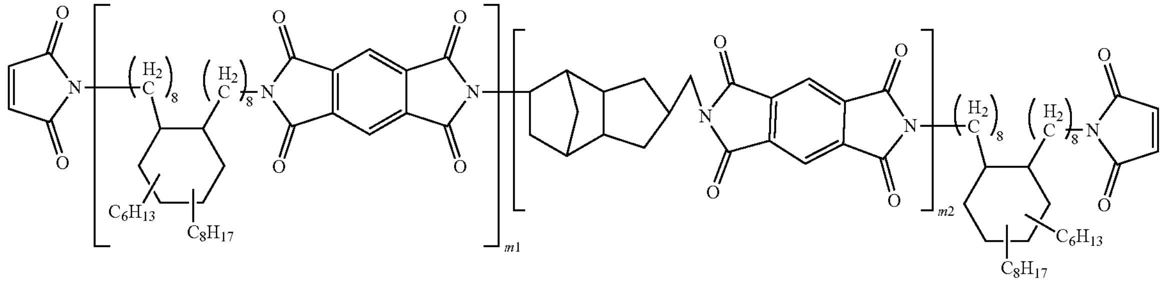
m1 = 3(average); m2 = 3(average)

-continued

BMI-3000 and BMI-5000

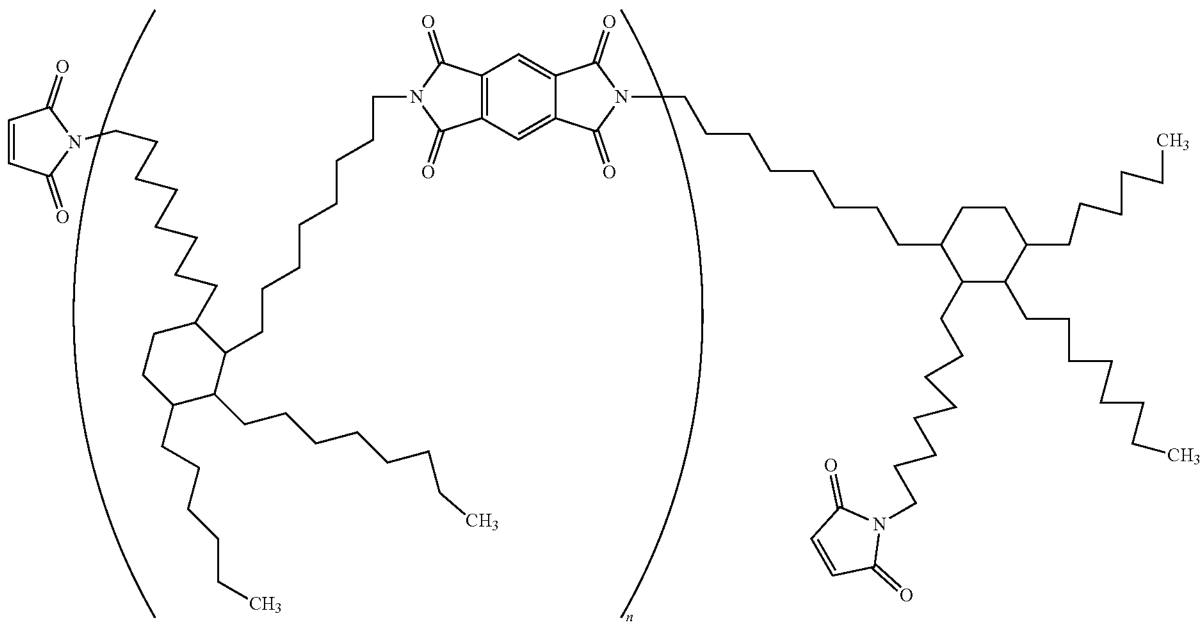

Where n = 1 to 10

For example, relative to 100 parts by weight of the vinyl group-containing polyphenylene ether resin, the resin composition comprises 5 parts by weight to 30 parts by weight of a maleimide resin. For example, in one embodiment, relative to 100 parts by weight of the vinyl group-containing polyphenylene ether resin, the maleimide resin is 5 parts by weight, 10 parts by weight, 15 parts by weight, 20 parts by weight, 25 parts by weight or 30 parts by weight, but not limited thereto.

For example, in one embodiment, the active ester used herein is obtained by esterification of an aromatic carboxylic acid compound and an aromatic alcohol compound.

For example, in one embodiment, the active ester used herein comprises a structure of Formula (I):

Formula (I)

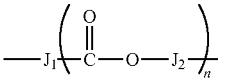

wherein $J_1$ and $J_2$ each independently comprise an arylene group (such as a phenylene group, a naphthalene group or other divalent aromatic rings), and n is an integer of 1 to 30. For example, $J_1$ and $J_2$ may be independently a substituted or unsubstituted arylene group; or $J_1$ and $J_2$ may be independently a structure containing a substituted or unsubstituted arylene group. In other words, any structure containing a divalent arylene group may be $J_1$ and $J_2$.

For example, in one embodiment, the active ester may comprise one type for using alone and may also be used as a combination of two or more types at any ratio. As an active ester, in general, it is preferable to use two or more ester groups with high reactivity per molecule, such as an ester compound derived from phenol ester, thiophenol ester, N-hydroxylamine ester or heterocyclic hydroxyl compound.

The active ester is preferably obtained by a condensation reaction of a carboxylic compound and/or a thiocarboxylic compound with a hydroxyl compound and/or a thiol compound. In particular, from the perspective of improving thermal resistance, the active ester is preferably obtained from a carboxylic compound and a hydroxyl compound, more preferably obtained from a carboxylic compound and a phenol compound and/or a naphthol compound, such as obtained by reacting an aromatic compound containing two carboxylic groups with an aromatic compound containing two hydroxyl groups. Examples of the carboxylic compound include but are not limited to benzoic acid, acetic acid, succinic acid, maleic acid, itaconic acid, phthalic acid, isophthalic acid, terephthalic acid, and pyromellitic acid. Examples of the phenol compound or the naphthol compound include but are not limited to hydroquinone, resorcinol, bisphenol A, bisphenol F, bisphenol S, phenolphthalein, methylated bisphenol A, methylated bisphenol F, methylated bisphenol S, phenol, o-cresol, m-cresol, p-cresol, catechol, α-naphthol, β-naphthol, 1,5-dihydroxynaphthalene, 1,6-dihydroxynaphthalene, 2,6-dihydroxynaphthalene, dihydroxybenzophenone, trihydroxybenzophenone, tetrahydroxybenzophenone, phloroglucinol, benzenetriol, dicyclopentadiene diphenol compound, phenol novolac varnish, etc., but not limited thereto. The "dicyclopentadiene diphenol compound" described herein refers to a diphenol compound obtained by condensing two phenol molecules onto a dicyclopentadiene molecule.

The active ester suitable for the present disclosure may be for example: active esters containing a dicyclopentadiene diphenol structure, such as EXB9451, EXB9460, EXB9460S, HPC-8000L, HPC-8000 and HPC-8000H (manufactured by DIC); active esters containing a naphthalene structure, such as HP-B-8151, EXB-8100L, EXB-9416, HPC-8100, HPC-8150 and EXB-8 (manufactured by DIC); other active esters, such as HPC-8200 (manufactured by DIC); phosphorus-containing active esters, such as EXB9401 (manufactured by DIC) and DC808 (manufactured by Mitsubishi Chemical Corporation); active esters of acetylated products of phenol novolacs; active esters of benzoyl products of novolacs, such as YLH1026, YLH1030, YLH1048 (manufactured by Mitsubishi Chemical Corporation) and PC1300-02 (manufactured by Air Water Corporation); and active esters containing styryl groups and naphthalene structures.

For example, in one embodiment, the active ester has a structure of Formula (I):

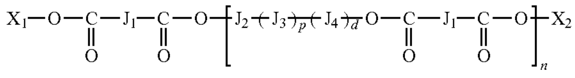

wherein $X_1$ and $X_2$ are each independently a phenyl group or a naphthyl group; $J_1$, $J_2$ and $J_4$ are each independently an unsubstituted arylene group (such as a phenylene group, a naphthylene group or other divalent aromatic rings) or an substituted arylene group; $J_3$ is an cycloalkylene group, preferably a dicyclopentadienylene group; p and d are each independently 0 or 1; and n is an integer of 1 to 30.

For example, in one embodiment, the active ester containing a structure of Formula (I) may be an active ester containing a dicyclopentadiene diphenol structure, as shown below:

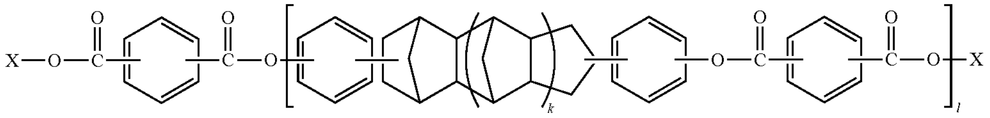

wherein X is a phenyl group or a naphthyl group, k is 0 or 1, and 1 is an integer of 1 to 5.

For example, in one embodiment, the active ester containing a structure of Formula (I) may be an active ester containing a naphthalene structure, as shown below:

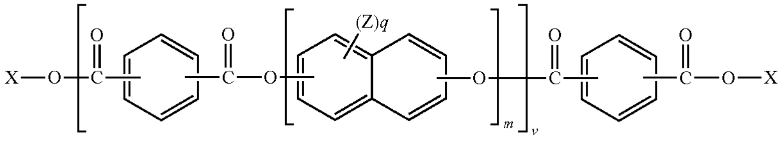

wherein X is a phenyl group or a naphthyl group; Z in (Z)q is each independently a methyl group, a hydrogen atom or an ester group; q is an integer of 1 to 3; V is an integer of 1 to 10; and m is an integer of 1 to 10.

For example, in one embodiment, the active ester containing a structure of Formula (I) may be an active ester containing a styryl group and a naphthalene structure, as shown below:

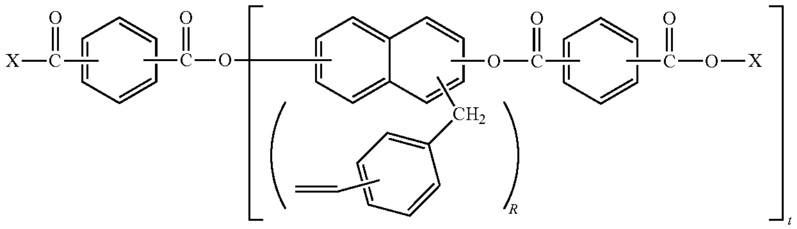

wherein X is a phenyl group or a naphthyl group, R is an integer of 1 to 6, and t is an integer of 1 to 20.

For example, relative to 100 parts by weight of the vinyl group-containing polyphenylene ether resin, the resin composition of the present disclosure comprises 5 parts by weight to 40 parts by weight of an active ester. For example, in one embodiment, relative to 100 parts by weight of the vinyl group-containing polyphenylene ether resin, the active ester is 5 parts by weight, 10 parts by weight, 15 parts by weight, 20 parts by weight, 25 parts by weight, 30 parts by weight, 35 parts by weight or 40 parts by weight, but not limited thereto.

For example, in one embodiment, the phosphate ester used herein refers to a product in which all or part of the hydrogen atoms of the hydroxyl groups in the phosphate molecule are independently substituted by an alkyl group or an aryl group. Different substituent groups may be the same alkyl groups or aryl groups or different alkyl groups or aryl groups; alternatively, the alkyl group and the aryl group may appear at the same time. The hydroxyl groups in the phosphate molecule may be replaced at the same time, or only one or more of them may be replaced to generate monophosphate ester, diphosphate ester or triphosphate ester, symmetric phosphate ester and asymmetric phosphate ester. In particular, from the perspective of difference rate of electrical properties, the phosphate ester is preferably a phosphate ester that can be decomposed to produce polyphenols, more preferably a phosphate ester that can be decomposed to produce diphenols, such as but not limited to a phosphate ester that can be decomposed to produce diphenols in a thermal environment. For example, in one embodiment, the phosphate ester used herein includes but not limited to hydroquinone bis-(diphenylphosphate), bisphenol A bis-(diphenylphosphate) or resorcinol bis-(dixylenyl phosphate), such as commercially available PX-200, PX-201 and PX-202. For example, in one embodiment, the phosphate ester used herein includes but not limited to resorcinol bis-(diphenyl phosphate), hydroquinone bis-(dixylenyl phosphate), bisphenol A bis-(diphenyl phosphate), resorcinol bis-(dixylenyl phosphate), biphenol bis-(dixylenyl phosphate) or a combination thereof.

For example, the resin composition described herein may use the above-mentioned phosphate ester as a flame retardant. The articles made by using the phosphate ester disclosed herein, in contrast to articles made by using different flame retardants, may achieve improvement in one or more of the properties including dissipation factor, dissipation factor after thermal aging, dielectric constant variation rate, dissipation factor variation rate, copper foil peeling strength after thermal treatment, NaOH alkali resistance, thermal resistance after moisture absorption and time to delamination. For example, the resin composition described herein may use one or more of the above-mentioned phosphate esters as a flame retardant, preferably not containing different flame retardants because adding other flame retardants may deteriorate dissipation factor after thermal aging, NaOH alkali resistance or other properties.

For example, relative to 100 parts by weight of the vinyl group-containing polyphenylene ether resin, the resin composition of the present disclosure comprises 5 parts by weight to 40 parts by weight of a phosphate ester. For example, in one embodiment, relative to 100 parts by weight of the vinyl group-containing polyphenylene ether resin, the phosphate ester is 5 parts by weight, 10 parts by weight, 15 parts by weight, 20 parts by weight, 25 parts by weight, 30 parts by weight, 35 parts by weight or 40 parts by weight, but not limited thereto.

Unless otherwise specified, the resin composition of the present disclosure may optionally further comprise a maleimide triazine resin, an unsaturated polyolefin resin, a hydrogenated unsaturated polyolefin resin, a small molecule vinyl group-containing resin, a styrene maleic anhydride resin, a phenolic resin, a benzoxazine resin, a cyanate ester resin, a polyamide resin, a polyimide resin or a combination thereof.

For example, in one embodiment, the maleimide triazine resin described in the present disclosure is not particularly limited and may include any one or more maleimide triazine resins useful for preparing a prepreg, a resin film, a laminate or a printed circuit board. For example, the maleimide triazine resin may be obtained by polymerizing a cyanate ester resin and a maleimide resin. The maleimide triazine resin may be obtained by polymerizing bisphenol A cyanate ester resin and maleimide resin, by polymerizing bisphenol F cyanate ester resin and maleimide resin, by polymerizing phenol novolac cyanate ester resin and maleimide resin or by polymerizing dicyclopentadiene-containing cyanate ester resin and maleimide resin, but not limited thereto. For example, the maleimide triazine resin may be obtained by polymerizing the cyanate ester resin and the maleimide resin at any molar ratio. For example, relative to 1 mole of the maleimide resin, 1 to 10 moles of the cyanate ester resin may be used. For example, relative to 1 mole of the maleimide resin, 1, 2, 4, or 6 moles of the cyanate ester resin may be used, but not limited thereto.

For example, in one embodiment, the unsaturated polyolefin resin described herein may include any one or more unsaturated C═C double bond-containing polyolefin resins useful for preparing a prepreg, a resin film, a laminate or a printed circuit board. Examples include but are not limited to styrene-butadiene-divinylbenzene terpolymer, styrene-butadiene-maleic anhydride terpolymer, styrene-butadiene-styrene terpolymer; vinyl-polybutadiene-urethane oligomer, styrene-butadiene copolymer, styrene-isoprene copolymer, polybutadiene, methylstyrene homopolymer, petroleum resin, cycloolefin copolymer or a combination thereof.

For example, in one embodiment, the hydrogenated unsaturated polyolefin resin described herein is obtained by hydrogenating an unsaturated polyolefin resin and may include any one or more unsaturated C═C double bond-free hydrogenated unsaturated polyolefin resins useful for preparing a prepreg, a resin film, a laminate or a printed circuit board. Examples include but are not limited to any one or a combination of hydrogenated styrene-butadiene copolymer and hydrogenated styrene-isoprene copolymer.

For example, in one embodiment, the small molecule vinyl group-containing resin described herein refers to a vinyl group-containing compound with a molecular weight of less than or equal to 1000, preferably between 100 and 900 and more preferably between 100 and 800. For example, the small molecule vinyl group-containing resin comprises, but not limited to, styrene, divinylbenzene, bis(vinylbenzyl) ether, 1,2,4-trivinylcyclohexane (TVCH), bis(vinylphenyl) ethane (BVPE), bis(vinylphenyl)hexane, bis(vinylphenyl) dimethyl ether, bis(vinylphenyl) dimethyl benzene, triallyl isocyanurate (TAIC), and/or triallyl cyanurate (TAC). In one embodiment, the small molecule vinyl group-containing resin comprises any one of the foregoing components, a prepolymer of any one of the foregoing components, or a combination thereof.

For example, in one embodiment, the styrene maleic anhydride resin used herein may have a ratio of styrene (S) to maleic anhydride (MA) of 1:1, 2:1, 3:1, 4:1, 6:1, or 8:1, examples including but not limited to styrene maleic anhydride copolymers such as SMA-1000, SMA-2000, SMA- 3000, EF-30, EF-40, EF-60 and EF-80 available from Cray Valley, or styrene maleic anhydride copolymers such as C400, C500, C700 and C900 available from Polyscope. Additionally, the styrene maleic anhydride resin may also be an esterified styrene maleic anhydride copolymer, such as esterified styrene maleic anhydride copolymers SMA1440, SMA17352, SMA2625, SMA3840 and SMA31890 available from Cray Valley. Unless otherwise specified, the styrene maleic anhydride resin can be added individually or as a combination to the resin composition of this disclosure.

For example, in one embodiment, the phenolic resin described herein may be a mono-functional, bifunctional or multi-functional phenolic resin. The type of the phenolic resin is not particularly limited and may include those currently used in the field to which this disclosure pertains. Preferably, the phenolic resin is selected from a phenoxy resin, a novolac resin and a combination thereof.

For example, in one embodiment, the benzoxazine resin described herein may include bisphenol A benzoxazine resin, bisphenol F benzoxazine resin, phenolphthalein benzoxazine resin, dicyclopentadiene benzoxazine resin, or phosphorus-containing benzoxazine resin, such as but not limited to LZ-8270 (phenolphthalein benzoxazine resin), LZ-8280 (bisphenol F benzoxazine resin), and LZ-8290 (bisphenol A benzoxazine resin) available from Huntsman or HFB-2006M available from Showa High Polymer.

For example, in one embodiment, the cyanate ester resin described herein may include any known cyanate ester resins used in the art, including but not limited to a cyanate ester resin with an Ar—O—C≡N structure (wherein Ar represents an aromatic group, such as benzene, naphthalene or anthracene), a phenol novolac cyanate ester resin, a bisphenol A cyanate ester resin, a bisphenol A novolac cyanate ester resin, a bisphenol F cyanate ester resin, a bisphenol F novolac cyanate ester resin, a dicyclopentadiene-containing cyanate ester resin, a naphthalene-containing cyanate ester resin, a phenolphthalein cyanate ester resin, or a combination thereof. Examples of the cyanate ester resin include but are not limited to Primaset PT-15, PT-30S, PT-60S, BA-200, BA-230S, BA-3000S, BTP-2500, BTP-6020S, DT-4000, DT-7000, ULL950S, HTL-300, CE-320, LVT-50, or LeCy available from Lonza.

For example, in one embodiment, the polyamide resin described herein may be any polyamide resins known in the field to which this disclosure pertains, including but not limited to various commercially available polyamide resin products.

For example, in one embodiment, the polyimide resin described herein may be any polyimide resins known in the field to which this disclosure pertains, including but not limited to various commercially available polyimide resin products.

In one embodiment, the resin composition disclosed herein may further optionally comprise amine curing agent, inorganic filler, curing accelerator, polymerization inhibitor, coloring agent, solvent, toughening agent, silane coupling agent or a combination thereof.

For example, in one embodiment, the amine curing agent described herein may be dicyandiamide, diamino diphenyl sulfone, diamino diphenyl methane, diamino diphenyl ether, diamino diphenyl sulfide or a combination thereof, but not limited thereto.

For example, in one embodiment, the inorganic filler used herein may be any one or more inorganic fillers used for preparing a resin film, a prepreg, a laminate or a printed circuit board; examples include but are not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride, and calcined kaolin. Moreover, the inorganic filler can be spherical, fibrous, plate-like, particulate, flake-like or whisker-like and can be optionally pretreated by a silane coupling agent.

In one embodiment, for example, the curing accelerator (including curing initiator) suitable for the present disclosure may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butyl peroxy)-3-hexyne (25B), bis(tert-butylperoxyisopropyl)benzene or a combination thereof.

In one embodiment, for example, the polymerization inhibitor used herein is not particularly limited and may be any polymerization inhibitor known in the field to which this disclosure pertains, including but not limited to various commercially available polymerization inhibitor products. For example, the polymerization inhibitor may comprise, but not limited to, 1,1-diphenyl-2-picrylhydrazyl radical, methyl acrylonitrile, dithioester, nitroxide-mediated radical, triphenylmethyl radical, metal ion radical, sulfur radical, hydroquinone, 4-methoxyphenol, p-benzoquinone, phenothiazine, β-phenylnaphthylamine, 4-t-butylcatechol, methylene blue, 4,4'-butylidenebis(6-t-butyl-3-methylphenol), 2,2'-methylenebis(4-ethyl-6-t-butyl phenol) or a combination thereof.

For example, the nitroxide-mediated radical may comprise, but not limited to, nitroxide radicals derived from cyclic hydroxylamines, such as 2,2,6,6-substituted piperidine 1-oxyl free radical, 2,2,5,5-substituted pyrrolidine 1-oxyl free radical or the like. Preferred substitutes include alkyl groups with 4 or fewer carbon atoms, such as methyl group or ethyl group. Examples of the compound containing a nitroxide radical include such as 2,2,6,6-tetramethylpiperidine 1-oxyl free radical, 2,2,6,6-tetraethylpiperidine 1-oxyl free radical, 2,2,6,6-tetramethyl-4-oxo-piperidine 1-oxyl free radical, 2,2,5,5-tetramethylpyrrolidine 1-oxyl free radical, 1,1,3,3-tetramethyl-2-isoindoline oxygen radical, N,N-di-tert-butylamine oxygen free radical and so on. Nitroxide radicals may also be replaced by using stable radicals such as galvinoxyl radicals.

The polymerization inhibitor suitable for the resin composition of the present disclosure may include products derived from the polymerization inhibitor with its hydrogen atom or group substituted by other atom or group. Examples include products derived from a polymerization inhibitor with its hydrogen atom substituted by an amino group, a hydroxyl group, a carbonyl group or the like.

In one embodiment, for example, the coloring agent suitable for the present disclosure may comprise, but not limited to, dye or pigment.

In one embodiment, for example, the purpose of adding solvent is to change the solid content of the resin composition and to adjust the viscosity of the resin composition. For example, the solvent may comprise, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

In one embodiment, for example, the purpose of adding toughening agent is to improve the toughness of the resin composition. The toughening agent may comprise, but not limited to, carboxyl-terminated butadiene acrylonitrile rubber (CTBN rubber), core-shell rubber, or a combination thereof.

In one embodiment, for example, the silane coupling agent used herein may comprise silane (such as but not limited to siloxane) and may be further categorized according to the functional groups into amino silane compound, epoxide silane compound, vinylsilane compound, acrylate silane compound, methacrylate silane compound, hydroxylsilane compound, isocyanate silane compound, methacryloxy silane compound and acryloxy silane compound.

The resin composition of various embodiments may be processed to make different articles, such as those suitable for use as components in electronic products, including but not limited to a prepreg, a resin film, a laminate or a printed circuit board.

For example, the resin composition from each embodiment of this disclosure can be used to make a prepreg, which comprises a reinforcement material and a layered structure disposed thereon. The layered structure is formed by heating the resin composition at a high temperature to the semi-cured state (B-stage). Suitable baking temperature for making the prepreg may be 100° C. to 200° C. The reinforcement material may be any one of a fiber material, woven fabric, and non-woven fabric, and the woven fabric preferably comprises fiberglass fabrics. Types of fiberglass fabrics are not particularly limited and may be any commercial fiberglass fabric used for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pretreated by a silane coupling agent. The prepreg may be further heated and cured to the C-stage to form an insulation layer.

For example, the resin composition from each embodiment of this disclosure can be used to make a resin film, which is prepared by heating and baking to semi-cure the resin composition. The resin composition may be selectively coated on a polyethylene terephthalate film (PET film), a polyimide film (PI film), a copper foil or a resin-coated copper, followed by heating and baking to semi-cure the resin composition to form the resin film.

For example, the resin composition from each embodiment of this disclosure can be used to make a laminate, which comprises two metal foils and an insulation layer disposed between the metal foils, wherein the insulation layer is made by curing the resin composition at high temperature and high pressure to the C-stage, a suitable curing temperature being for example between 180° C. and 300° C. and preferably between 200° C. and 280° C. and a suitable curing time being 90 to 180 minutes and preferably 120 to 150 minutes. The insulation layer may be formed by curing the aforesaid prepreg or resin film to the C-stage. The metal foil may comprise copper, aluminum, nickel, platinum, silver, gold or alloy thereof, such as a copper foil. Preferably, the laminate is a copper-clad laminate (CCL).

In addition, the laminate may be further processed by trace formation processes to make a circuit board, such as a printed circuit board.

Preferably, the resin composition disclosed herein or the article made therefrom achieves improvements in one or more properties including dielectric constant, dissipation factor, dielectric constant after thermal aging, dissipation factor after thermal aging, dielectric constant variation rate, dissipation factor variation rate, glass transition temperature, copper foil peeling strength, copper foil peeling strength after thermal treatment, NaOH alkali resistance, thermal resistance after moisture absorption and time to delamination.

For example, the resin composition according to the present disclosure or the article made therefrom may achieve one, more or all of the following properties:

a dielectric constant at 10 GHz as measured by reference to JIS $C_{2565}$ of less than or equal to 3.40, such as between 3.15 and 3.40;

a dissipation factor at 10 GHz as measured by reference to JIS $C_{2565}$ of less than or equal to 0.00210, such as between 0.00168 and 0.00210;

a dielectric constant at 10 GHz as measured by reference to JIS $C_{2565}$ after being subject to 96 hours of aging at 188° C. of less than or equal to 3.41, such as between 3.15 and 3.41;

a dissipation factor at 10 GHz as measured by reference to JIS $C_{2565}$ after being subject to 96 hours of aging at 188° C. of less than or equal to 0.00369, such as between 0.00275 and 0.00369;

a dielectric constant variation rate at 10 GHz as calculated after being subject to 96 hours of aging at 188° C. of less than or equal to 0.29%, such as between −0.46% and 0.29%;

a dissipation factor variation rate at 10 GHz as calculated after being subject to 96 hours of aging at 188° C. of less than or equal to 86.53%, such as between 62.79% and 86.53%;

a glass transition temperature as measured by using a thermal mechanical analyzer by reference to IPC-TM-650 2.4.24.5 of greater than or equal to 170° C., such as between 170° C. and 190° C.;

a copper foil peeling strength as measured by reference to IPC-TM-650 2.4.8 of greater than or equal to 3.00 lb/in, such as between 3.00 lb/in and 3.55 lb/in;

a copper foil peeling strength as measured by reference to IPC-TM-650 2.4.8 of greater than or equal to 3.00 lb/in after thermal treatment performed by reference to IPC-TM-650 2.6.27, such as between 3.00 lb/in and 3.50 lb/in;

an alkali resistance as measured from an NaOH alkali resistance test of greater than or equal to 4.0 minutes, such as between 4.0 minutes and 7.0 minutes;

no delamination occurs after subjecting the article to a pressure cooking test by reference to IPC-TM-650 2.6.16.1 followed by a thermal resistance test by reference to IPC-TM-650 2.4.23; and a time to delamination as measured by reference to IPC-TM-650 2.4.23 in a time to delamination test of greater than 15 minutes.

Raw materials below are used to prepare the resin compositions of various Examples and Comparative Examples of the present disclosure according to the amount listed in Table 1 to Table 5 and further fabricated to prepare test samples or articles. Compositions and test results of resin compositions of Examples and Comparative Examples are listed below in Table 1 to Table 5 (in part by weight).

SA9000: methacrylate group-terminated polyphenylene ether resin, available from Sabic.

OPE-2st 2200: vinylbenzyl group-terminated polyphenylene ether resin, available from Sabic.

BMI-2300: polyphenylmethane maleimide, available from Daiwakasei Industry Co., Ltd.

BMI-80: 2,2'-bis[4-(4-maleimidephenoxy)phenyl]propane, available from KI Chemical.

BMI-689: maleimide resin containing aliphatic long-chain structure, available from Designer Molecules Inc.

HPC-8000: active ester containing dicyclopentadiene diphenol structure, available from D.I.C. Corporation.

PC1300-02: active ester containing styryl group and naphthalene structure, available from AIR WATER Corporation.

BPA active ester: bisphenol A active ester, commercially available.

PX-200: resorcinol bis(2,6-dixylenyl phosphate), available from Daihachi Chemical Industry Co., Ltd.

PX-202: 4,4'-biphenol bis-(2,6-dixylenyl phosphate), available from Daihachi Chemical Industry Co., Ltd.

SPB-100: phosphazene compound, available from Otsuka Chemical Co., Ltd.

XZ92741: DOPO-containing hydroxyl novolac flame retardant, available from Dow Chemical Company.

OP-935: aluminum phosphinate, available from Clariant.

Di-DPPO: diphenylphosphine oxide-containing flame retardant, as shown below, synthesized by reference to Chinese Patent Application Publication CN105440645A.

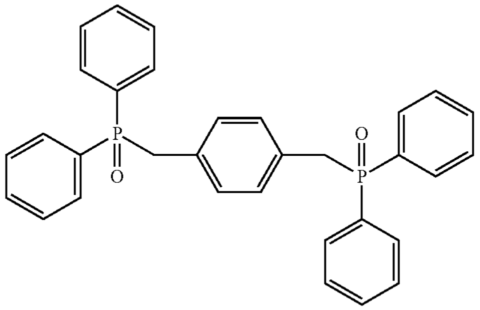 [SMILES: O=P(Cc1ccc(CP(=O)(c2ccccc2)c2ccccc2)cc1)(c1ccccc1)c1ccccc1]

Di-DOPO: di-DOPO phosphorus-containing high melting point flame retardant, as shown below, synthesized by reference to Chinese Patent Application Publication CN105936745A.

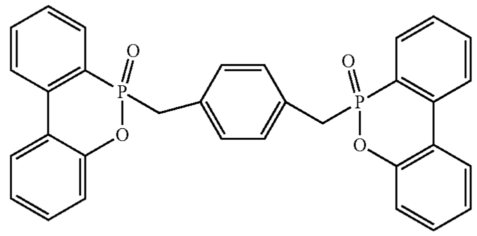 [SMILES: O=P1(Cc2ccc(CP3(=O)Oc4ccccc4-c4ccccc43)cc2)Oc2ccccc2-c2ccccc21]

HP-7200H: dicyclopentadiene epoxy resin, available from D.I.C. Corporation.

G1653: hydrogenated styrene ethylene/butylene styrene block copolymer (SEBS), available from Kraton.

SC-2500SMJ: spherical silica pre-treated by acrylate silane coupling agent, available from Admatechs.

TOL: toluene, available from Chambeco Group.

MEK: methyl ethyl ketone, commercially available.

25B: 2,5-dimethyl-2,5-di(t-butylperoxy)-3-hexyne, available from NOF Corporation.

In the Tables, "Z" represents the total amount of components excluding (i.e., not containing) inorganic filler and solvent in the resin composition of each Example or each Comparative Example. For example, "Z*1.0" represents the amount of inorganic filler is 1.0 time of "Z". For example, in Example E1, "Z*1.0" represents that the amount of inorganic filler is 150.5 parts by weight (150.5 parts by weight multiplied by 1.0).

The amount of solvent is shown as "PA" in the Tables to indicate a "proper amount" to represent an amount of solvents used to achieve a desirable solid content of the whole resin composition. For a resin composition comprises methyl ethyl ketone and toluene as solvents, "PA" represents the total amount of the two solvents used to achieve a solid content of the whole resin composition of such as but not limited to 70 wt %.

Compositions and test results of resin compositions of Examples and Comparative Examples are listed below in Table 1 to Table 5 (in part by weight):

TABLE 1

Resin compositions of Examples (in part by weight) and test results

| Composition | Component | Name | E1 | E2 | E3 | E4 | E5 | E6 | E7 |
|---|---|---|---|---|---|---|---|---|---|
| vinyl group-containing | PPO-A | SA9000 | 100 | | 50 | 100 | 100 | 100 | 100 |
| polyphenylene ether resin | PPO-B | OPE-2st 2200 | | 100 | 50 | | | | |
| maleimide resin | BMI-A | BMI-2300 | 10 | 10 | 10 | 5 | 30 | | |
| | BMI-B | BMI-80 | | | | | | 10 | |
| | BMI-C | BMI-689 | | | | | | | 10 |

TABLE 1-continued

| Resin compositions of Examples (in part by weight) and test results | | | | | | | | | |
|---|---|---|---|---|---|---|---|---|---|
| active ester | active ester A | HPC-8000 | 20 | 20 | 20 | 20 | 20 | 20 | 20 |
| | active ester B | PC1300-02 | | | | | | | |
| | active ester C | BPA active ester | | | | | | | |
| phosphate ester | phosphate ester A | PX-200 | 20 | 20 | 20 | 20 | 20 | 20 | 20 |
| | phosphate ester B | PX-202 | | | | | | | |
| flame retardant | phosphazene | SPB-100 | | | | | | | |
| | DOPO-PN | XZ92741 | | | | | | | |
| | phosphite | OP-935 | | | | | | | |
| | Di-DPPO | Di-DPPO | | | | | | | |
| | Di-DOPO | Di-DOPO | | | | | | | |
| epoxy resin | DCPD-EP | HP-7200H | | | | | | | |
| hydrogenated rubber | SEBS | G1653 | | | | | | | |
| inorganic filler | spherical silica | SC-2500SMJ | Z*1.0 | Z*1.0 | Z*1.0 | Z*1.0 | Z*1.0 | Z*1.0 | Z*1.0 |
| solvent | toluene | TOL | PA | PA | PA | PA | PA | PA | PA |
| | MEK | MEK | PA | PA | PA | PA | PA | PA | PA |
| curing accelerator | peroxide | 25B | 0.5 | 0.5 | 0.5 | 0.5 | 0.5 | 0.5 | 0.5 |
| **Property** | **Test method** | **Unit** | **E1** | **E2** | **E3** | **E4** | **E5** | **E6** | **E7** |
| dielectric properties before thermal aging | Dk @10 GHz | none | 3.260 | 3.250 | 3.255 | 3.250 | 3.310 | 3.250 | 3.220 |
| | Df @10 GHz | | 0.00185 | 0.00190 | 0.00188 | 0.00178 | 0.00210 | 0.00180 | 0.00178 |
| dielectric properties after thermal aging | Dk @10 GHz | | 3.260 | 3.250 | 3.255 | 3.250 | 3.310 | 3.250 | 3.220 |
| | Df @10 GHz | | 0.00325 | 0.00335 | 0.00331 | 0.00313 | 0.00369 | 0.00318 | 0.00315 |
| Dk variation rate | | | 0.00% | 0.00% | 0.00% | 0.00% | 0.00% | 0.00% | 0.00% |
| Df variation rate | | | 75.68% | 76.32% | 76.06% | 75.84% | 75.71% | 76.67% | 76.97% |
| Tg | TMA | ° C. | 175 | 180 | 177 | 170 | 190 | 173 | 170 |
| PS | Hoz HVLP2 | lb/in | 3.40 | 3.00 | 3.20 | 3.50 | 3.00 | 3.40 | 3.42 |
| PS after thermal treatment | Hoz HVLP2 five reflow cycles at 260° C. | lb/in | 3.32 | 3.00 | 3.15 | 3.45 | 3.00 | 3.34 | 3.39 |
| alkali resistance | NaOH 20%, 90° C. | minute | 6.0 | 6.0 | 6.0 | 7.0 | 5.0 | 6.0 | 6.0 |
| PCT thermal resistance | 121° C., 5 h | none | ○○○ | ○○○ | ○○○ | ○○○ | ○○○ | ○○○ | ○○○ |
| time to delamination | | minute | >15 | >15 | >15 | >15 | >15 | >15 | >15 |

TABLE 2

| Resin compositions of Examples (in part by weight) and test results | | | | | | | | | |
|---|---|---|---|---|---|---|---|---|---|
| **Composition** | **Component** | **Name** | **E8** | **E9** | **E10** | **E11** | **E12** | **E13** | **E14** |
| vinyl group-containing polyphenylene ether resin | PPO-A | SA9000 | 100 | 100 | 100 | 100 | 100 | 100 | 100 |
| | PPO-B | OPE-2st 2200 | | | | | | | |
| maleimide resin | BMI-A | BMI-2300 | 5 | 10 | 10 | 10 | 10 | 10 | 10 |
| | BMI-B | BMI-80 | 5 | | | | | | |
| | BMI-C | BMI-689 | 5 | | | | | | |
| active ester | active ester A | HPC-8000 | 20 | | | 10 | 5 | 40 | 20 |
| | active ester B | PC1300-02 | | 20 | | 10 | | | |
| | active ester C | BPA active ester | | | 20 | 10 | | | |
| phosphate ester | phosphate ester A | PX-200 | 20 | 20 | 20 | 20 | 20 | 20 | |
| | phosphate ester B | PX-202 | | | | | | | 20 |
| flame retardant | phosphazene | SPB-100 | | | | | | | |
| | DOPO-PN | XZ92741 | | | | | | | |
| | phosphite | OP-935 | | | | | | | |
| | Di-DPPO | Di-DPPO | | | | | | | |
| | Di-DOPO | Di-DOPO | | | | | | | |
| epoxy resin | DCPD-EP | HP-7200H | | | | | | | |
| hydrogenated rubber | SEBS | G1653 | | | | | | | |
| inorganic filler | spherical silica | SC-2500SMJ | Z*1.0 | Z*1.0 | Z*1.0 | Z*1.0 | Z*1.0 | Z*1.0 | Z*1.0 |

TABLE 2-continued

Resin compositions of Examples (in part by weight) and test results

| | | | E8 | E9 | E10 | E11 | E12 | E13 | E14 |
|---|---|---|---|---|---|---|---|---|---|
| solvent | toluene | TOL | PA | PA | PA | PA | PA | PA | PA |
| | MEK | MEK | PA | PA | PA | PA | PA | PA | PA |
| curing accelerator | peroxide | 25B | 0.5 | 0.5 | 0.5 | 0.5 | 0.5 | 0.5 | 0.5 |

| Property | Test method | Unit | E8 | E9 | E10 | E11 | E12 | E13 | E14 |
|---|---|---|---|---|---|---|---|---|---|
| dielectric properties before thermal aging | Dk @10 GHz | none | 3.240 | 3.220 | 3.270 | 3.275 | 3.220 | 3.280 | 3.260 |
| | Df @10 GHz | | 0.00182 | 0.00182 | 0.00190 | 0.00178 | 0.00193 | 0.00172 | 0.00185 |
| dielectric properties after thermal aging | Dk @10 GHz | | 3.240 | 3.215 | 3.270 | 3.260 | 3.221 | 3.265 | 3.260 |
| | Df @10 GHz | | 0.00322 | 0.00318 | 0.00335 | 0.00300 | 0.00360 | 0.00280 | 0.00325 |
| Dk variation rate | | | 0.00% | −0.16% | 0.00% | −0.46% | 0.03% | −0.46% | 0.00% |
| Df variation rate | | | 76.92% | 74.73% | 76.32% | 68.54% | 86.53% | 62.79% | 75.68% |
| Tg | TMA | ° C. | 178 | 180 | 175 | 173 | 180 | 170 | 181 |
| PS | Hoz HVLP2 | lb/in | 3.30 | 3.55 | 3.50 | 3.20 | 3.55 | 3.12 | 3.4 |
| PS after thermal treatment | Hoz HVLP2 five reflow cycles at 260° C. | lb/in | 3.25 | 3.50 | 3.45 | 3.15 | 3.50 | 3.00 | 3.35 |
| alkali resistance | NaOH 20%, 90° C. | minute | 6.0 | 6.0 | 6.0 | 5.0 | 7.0 | 4.0 | 6.0 |
| PCT thermal resistance | 121° C., 5 h | none | ○○○ | ○○○ | ○○○ | ○○○ | ○○○ | ○○○ | ○○○ |
| time to delamination | | minute | >15 | >15 | >15 | >15 | >15 | >15 | >15 |

TABLE 3

Resin compositions of Examples (in part by weight) and test results

| Composition | Component | Name | E15 | E16 | E17 | E18 | E19 | E20 | E21 |
|---|---|---|---|---|---|---|---|---|---|
| vinyl group-containing polyphenylene ether resin | PPO-A | SA9000 | 100 | 100 | 100 | 100 | 100 | 100 | 100 |
| | PPO-B | OPE-2st 2200 | | | | | | | |
| maleimide resin | BMI-A | BMI-2300 | 10 | 10 | 10 | 10 | 10 | 10 | 10 |
| | BMI-B | BMI-80 | | | | | | | |
| | BMI-C | BMI-689 | | | | | | | |
| active ester | active ester A | HPC-8000 | 20 | 20 | 20 | 20 | 20 | 20 | 20 |
| | active ester B | PC1300-02 | | | | | | | |
| | active ester C | BPA active ester | | | | | | | |
| phosphate ester | phosphate ester A | PX-200 | 5 | 15 | 40 | 20 | 20 | 20 | 20 |
| | phosphate ester B | PX-202 | | 15 | | | | | |
| flame retardant | phosphazene | SPB-100 | | | | | | | |
| | DOPO-PN | XZ92741 | | | | | | | |
| | phosphite | OP-935 | | | | | | | |
| | Di-DPPO | Di-DPPO | | | | | | | |
| | Di-DOPO | Di-DOPO | | | | | | | |
| epoxy resin | DCPD-EP | HP-7200H | | | | | | | |
| hydrogenated rubber | SEBS | G1653 | | | | | | | |
| inorganic filler | spherical silica | SC-2500SMJ | Z*1.0 | Z*1.0 | Z*1.0 | Z*0.5 | Z*2.0 | Z*1.0 | Z*1.0 |
| solvent | toluene | TOI | PA | PA | PA | PA | PA | PA | PA |
| | MEK | MEK | PA | PA | PA | PA | PA | PA | PA |
| curing accelerator | peroxide | 25B | 0.5 | 0.5 | 0.5 | 0.5 | 0.5 | 0.2 | 1.0 |

| Property | Test method | Unit | E15 | E16 | E17 | E18 | E19 | E20 | E21 |
|---|---|---|---|---|---|---|---|---|---|
| dielectric properties before thermal aging | Dk @10 GHz | none | 3.262 | 3.260 | 3.258 | 3.150 | 3.400 | 3.255 | 3.280 |
| | Df @10 GHz | | 0.00190 | 0.00175 | 0.00168 | 0.00190 | 0.00175 | 0.00180 | 0.00200 |
| dielectric properties after thermal aging | Dk @10 GHz | | 3.263 | 3.260 | 3.245 | 3.150 | 3.410 | 3.255 | 3.280 |
| | Df @10 GHz | | 0.00345 | 0.00290 | 0.00275 | 0.00335 | 0.00310 | 0.00315 | 0.00360 |
| Dk variation rate | | | 0.03% | 0.00% | −0.40% | 0.00% | 0.29% | 0.00% | 0.00% |
| Df variation rate | | | 81.58% | 65.71% | 63.69% | 76.32% | 77.14% | 75.00% | 80.00% |
| Tg | TMA | ° C. | 180 | 178 | 170 | 180 | 180 | 170 | 180 |
| PS | Hoz HVLP2 | lb/in | 3.30 | 3.40 | 3.50 | 3.50 | 3.10 | 3.20 | 3.45 |
| PS after thermal treatment | Hoz HVLP2 five reflow cycles at 260° C. | lb/in | 3.25 | 3.30 | 3.10 | 3.45 | 3.05 | 3.15 | 3.42 |

TABLE 3-continued

Resin compositions of Examples (in part by weight) and test results

| | | | | | | | | | |
|---|---|---|---|---|---|---|---|---|---|
| alkali resistance | NaOH 20%, 90° C. | minute | 7.0 | 5.0 | 4.0 | 6.0 | 6.0 | 6.0 | 6.0 |
| PCT thermal resistance | 121° C., 5 h | none | ○○○ | ○○○ | ○○○ | ○○○ | ○○○ | ○○○ | ○○○ |
| time to delamination | | minute | >15 | >15 | >15 | >15 | >15 | >15 | >15 |

TABLE 4

Resin compositions of Comparative Examples (in part by weight) and test results

| Composition | Component | Name | C1 | C2 | C3 | C4 | C5 | C6 | C7 |
|---|---|---|---|---|---|---|---|---|---|
| vinyl group-containing polyphenylene ether resin | PPO-A | SA9000 | 100 | 100 | 100 | 100 | 100 | 100 | 100 |
| | PPO-B | OPE-2st 2200 | | | | | | | |
| maleimide resin | BMI-A | BMI-2300 | 0 | 35 | 10 | 10 | 10 | 10 | 10 |
| | BMI-B | BMI-80 | | | | | | | |
| | BMI-C | BMI-689 | | | | | | | |
| active ester | active ester A | HPC-8000 | 20 | 20 | 0 | 45 | 20 | 20 | 20 |
| | active ester B | PC1300-02 | | | | | | | |
| | active ester C | BPA active ester | | | | | | | |
| phosphate ester | phosphate ester A | PX-200 | 20 | 20 | 20 | 20 | 0 | 45 | |
| | phosphate ester B | PX-202 | | | | | | | |
| flame retardant | phosphazene | SPB-100 | | | | | | | 20 |
| | DOPO-PN | XZ92741 | | | | | | | |
| | phosphite | OP-935 | | | | | | | |
| | Di-DPPO | Di-DPPO | | | | | | | |
| | Di-DOPO | Di-DOPO | | | | | | | |
| epoxy resin | DCPD-EP | HP-7200H | | | | | | | |
| hydrogenated rubber | SEBS | G1653 | | | | | | | |
| inorganic filler | spherical silica | SC-2500SMJ | Z*1.0 | Z*1.0 | Z*1.0 | Z*1.0 | Z*1.0 | Z*1.0 | Z*1.0 |
| solvent | toluene | TOL | PA | PA | PA | PA | PA | PA | PA |
| | MEK | MEK | PA | PA | PA | PA | PA | PA | PA |
| curing accelerator | peroxide | 25B | 0.5 | 0.5 | 0.5 | 0.5 | 0.5 | 0.5 | 0.5 |

| Property | Test method | Unit | C1 | C2 | C3 | C4 | C5 | C6 | C7 |
|---|---|---|---|---|---|---|---|---|---|
| dielectric properties before thermal aging | Dk @10 GHz | none | 3.240 | 3.350 | 3.160 | 3.320 | 3.270 | 3.250 | 3.300 |
| | Df @10 GHz | | 0.00172 | 0.00215 | 0.00205 | 0.00165 | 0.00195 | 0.00155 | 0.00235 |
| dielectric properties after thermal aging | Dk @10 GHz | | 3.240 | 3.350 | 3.210 | 3.300 | 3.320 | 3.225 | 3.450 |
| | Df @10 GHz | | 0.00302 | 0.00384 | 0.00415 | 0.00260 | 0.00405 | 0.00245 | 0.00550 |
| Dk variation rate | | | 0.00% | 0.00% | 1.58% | −0.60% | 1.53% | −0.77% | 4.55% |
| Df variation rate | | | 75.58% | 78.60% | 102.44% | 57.58% | 107.69% | 58.06% | 134.04% |
| Tg | TMA | ° C. | 155 | 200 | 185 | 161 | 183 | 158 | 180 |
| PS | Hoz HVLP2 | lb/in | 3.65 | 2.65 | 3.60 | 2.60 | 3.25 | 3.50 | 3.30 |
| PS after thermal treatment | Hoz HVLP2 five reflow cycles at 260° C. | lb/in | 2.50 | 2.00 | 3.57 | 2.05 | 3.20 | 2.80 | 3.10 |
| alkali resistance | NaOH 20%, 90° C. | minute | 7.0 | 5.0 | 7.0 | 3.0 | 7.0 | 1.0 | 2.0 |
| PCT thermal resistance | 121° C., 5 h | none | ○○○ | XXX | ○○○ | XXX | ○○○ | XXX | ○○○ |
| time to delamination | | minute | 10 | 13 | >15 | 5 | >15 | 5 | >15 |

TABLE 5

Resin compositions of Comparative Examples (in part by weight) and test results

| Composition | Component | Name | C8 | C9 | C10 | C11 | C12 | C13 |
|---|---|---|---|---|---|---|---|---|
| vinyl group-containing polyphenylene ether resin | PPO-A | SA9000 | 100 | 100 | 100 | 100 | 100 | 100 |
| | PPO-B | OPE-2st 2200 | | | | | | |
| maleimide resin | BMI-A | BMI-2300 | 10 | 10 | 10 | 10 | 10 | 10 |
| | BMI-B | BMI-80 | | | | | | |
| | BMI-C | BMI-689 | | | | | | |

TABLE 5-continued

Resin compositions of Comparative Examples (in part by weight) and test results

| | | | | | | | | |
|---|---|---|---|---|---|---|---|---|
| active ester | active ester A | HPC-8000 | 20 | 20 | 20 | 20 | 20 | 0 |
| | active ester B | PC1300-02 | | | | | | |
| | active ester C | BPA active ester | | | | | | |
| phosphate ester | phosphate ester A | PX-200 | | | | | 20 | 0 |
| | phosphate ester B | PX-202 | | | | | | |
| flame retardant | phosphazene | SPB-100 | | | | | | |
| | DOPO-PN | XZ92741 | 20 | | | | | |
| | phosphite | OP-935 | | 20 | | | | |
| | Di-DPPO | Di-DPPO | | | 20 | | | |
| | Di-DOPO | Di-DOPO | | | | 20 | | |
| epoxy resin | DCPD-EP | HP-7200H | | | | | 20 | |
| hydrogenated rubber | SEBS | G1653 | | | | | | 25 |
| inorganic filler | spherical silica | SC-2500SMJ | Z*1.0 | Z*1.0 | Z*1.0 | Z*1.0 | Z*1.0 | Z*1.0 |
| solvent | toluene | TOL | PA | PA | PA | PA | PA | PA |
| | MEK | MEK | PA | PA | PA | PA | PA | PA |
| curing accelerator | peroxide | 25B | 0.5 | 0.5 | 0.5 | 0.5 | 0.5 | 0.5 |

| Property | Test method | Unit | C8 | C9 | C10 | C11 | C12 | C13 |
|---|---|---|---|---|---|---|---|---|
| dielectric properties before thermal aging | Dk @10 GHz | none | 3.350 | 3.300 | 3.300 | 3.300 | 3.330 | 3.080 |
| | Df @10 GHz | | 0.00285 | 0.00260 | 0.00250 | 0.00195 | 0.00230 | 0.00161 |
| dielectric properties after thermal aging | Dk @10 GHz | | 3.550 | 3.450 | 3.450 | 3.350 | 3.450 | 3.150 |
| | Df @10 GHz | | 0.00700 | 0.00650 | 0.00600 | 0.00430 | 0.00570 | 0.00350 |
| Dk variation rate | | | 5.97% | 4.55% | 4.55% | 1.52% | 3.60% | 2.27% |
| Df variation rate | | | 145.61% | 150.00% | 140.00% | 120.51% | 147.83% | 117.39% |
| Tg | TMA | ° C. | 180 | 178 | 170 | 183 | 172 | 170 |
| PS | Hoz HVLP2 | lb/in | 3.50 | 3.20 | 3.00 | 3.10 | 3.20 | 3.40 |
| PS after thermal treatment | Hoz HVLP2 five reflow cycles at 260° C. | lb/in | 3.20 | 2.50 | 2.40 | 2.80 | 3.10 | 3.10 |
| alkali resistance | NaOH 20%, 90° C. | minute | 2.0 | 2.0 | 3.0 | 4.0 | 3.0 | 1.0 |
| PCT thermal resistance | 121° C., 5 h | none | ○○○ | XXX | ○○○ | ○○○ | ○○○ | ○○○ |
| time to delamination | | minute | >15 | 10 | >15 | >15 | >15 | >15 |

Resin compositions from Table 1 to Table 5 were used to make varnishes and various samples (specimens) as described below and tested under conditions specified below so as to obtain the test results.

Varnish

Components of the resin composition from each Example (abbreviated as E, such as E1 to E21) or Comparative Example (abbreviated as C, such as C1 to C13) were added to a stirrer according to the amounts listed in Tables 1-5 for stirring and well-mixing to form a resin varnish.

For example, in Example E1, 100 parts by weight of a vinyl group-containing polyphenylene ether resin (SA9000), 10 parts by weight of a maleimide resin (BMI-2300), 20 parts by weight of an active ester (HPC-8000) and 20 parts by weight of a phosphate ester (PX-200) were added to a stirrer containing a proper amount of toluene and a proper amount of methyl ethyl ketone (i.e., a proper amount (abbreviated as "PA") in Tables 1-5 represents an amount of solvent suitable for obtaining a desired solid content for the resin composition, such as a solid content of the varnish being 70 wt %), and the solution was mixed and stirred to fully dissolve the solid ingredients to form a homogeneous liquid state. Then "Z*1.0" parts by weight of spherical silica SC-2500SMJ (i.e., 150.5 parts by weight) were added and well dispersed, followed by adding 0.5 part by weight of a curing accelerator (25B, pre-dissolved by a proper amount of solvent) and stirring for 1 hour to obtain the varnish of resin composition E1.

In addition, according to the components and amounts listed in Table 1 to Table 5 above, varnishes of Examples E2 to E21 and Comparative Examples C1 to C13 were prepared following the preparation process of the varnish of Example E1.

Prepreg (Using 2116 L-Glass Fiber Fabric)

Resin compositions from different Examples (E1 to E21) and Comparative Examples (C1 to C13) listed in Table 1 to Table 5 were respectively added to a stirred tank, well mixed and fully dissolved as varnishes and then loaded to an impregnation tank. A fiberglass fabric (e.g., 2116 L-glass fiber fabric) was passed through the impregnation tank to adhere the resin composition on the fiberglass fabric, followed by heating at 120° C. to 150° C. to the semi-cured state (B-Stage) to obtain the prepreg (resin content of about 52%).

Prepreg (Using 1080 L-Glass Fiber Fabric)

Resin compositions from different Examples (E1 to E21) and Comparative Examples (C1 to C13) listed in Table 1 to Table 5 were respectively added to a stirred tank, well mixed and fully dissolved as varnishes and then loaded to an impregnation tank. A fiberglass fabric (e.g., 1080 L-glass fiber fabric) was passed through the impregnation tank to adhere the resin composition on the fiberglass fabric, followed by heating at 120° C. to 150° C. to the semi-cured state (B-Stage) to obtain the prepreg (resin content of about 77%).

Copper-Clad Laminate (Obtained by Laminating Eight Prepregs)

Two 18 μm hyper very low profile 2 copper foils (HVLP2 copper foils) and eight prepregs made from each resin composition (using 2116 L-glass fiber fabric) were prepared batchwise. Each prepreg has a resin content of about 52%. A copper foil, eight prepregs and a copper foil were superimposed in such order and then subject to a vacuum condition for lamination at 210° C. for 2 hours to form each copper-clad laminate sample. Insulation layers were formed by curing (C-stage) eight sheets of superimposed prepreg between the two copper foils, and the resin content of the insulation layers was about 52%.

Copper-Free Laminate (Obtained by Laminating Eight Prepregs)

Each copper-clad laminate (obtained by laminating eight prepregs) was etched to remove the two copper foils to obtain a copper-free laminate made from laminating eight prepregs and having a resin content of about 52%.

Copper-Free Laminate (Obtained by Laminating Two Prepregs)

Two 18 μm hyper very low profile 2 copper foils (HVLP2 copper foils) and two prepregs made from each resin composition (using 1080 L-glass fiber fabric) were prepared batchwise. Each prepreg has a resin content of about 77%. A copper foil, two prepregs and a copper foil were superimposed in such order and then subject to a vacuum condition for lamination at 210° C. for 2 hours to form each copper-clad laminate, which was then subject to an etching process to remove the copper foils on both sides to obtain a copper-free laminate sample. Insulation layers were formed by curing (C-stage) two sheets of superimposed prepreg between the two copper foils, and the resin content of the insulation layers was about 77%.

Test items and test methods are described below.

1. Dielectric Constant (Dk) and Dissipation Factor (Df)

In the measurement of dielectric constant and dissipation factor, a copper-free laminate sample (obtained by laminating two prepregs) was tested by using a microwave dielectrometer available from AET Corp. by reference to JIS C2565 at 10 GHz for analyzing each sample. Lower dielectric constant or lower dissipation factor represents better dielectric properties of the sample.

Under a 10 GHz frequency, for a Dk value of less than or equal to 3.60 and a Df value of less than or equal to 0.004, a difference in Dk value of greater than or equal to 0.05 represents substantial difference (i.e., significant technical difficulty) in dielectric constant of different laminates, and a difference in Dk value of less than 0.05 represents no substantial difference in dielectric constant of different laminates; a difference in Df value of less than 0.00005 represents no substantial difference in dissipation factor of different laminates, and a difference in Df value of greater than or equal to 0.00005 represents a substantial difference (i.e., significant technical difficulty) in dissipation factor of different laminates.

For example, articles made from the resin composition disclosed herein, as measured by reference to JIS C2565 at 10 GHz, have a dielectric constant of less than or equal to 3.40, such as between 3.15 and 3.40, and a dissipation factor of less than or equal to 0.00210, such as between 0.00168 and 0.00210.

2. Dielectric Constant after Thermal Aging (Dk after Thermal Aging) and Dissipation Factor after Thermal Aging (Df after Thermal Aging)

The aforesaid copper-free laminate sample (obtained by laminating two prepregs) was subject to the measurement of dissipation factor after thermal aging. The sample was subject to aging at 188° C. for 96 hours and then cooled to room temperature, followed by the measurement of dielectric constant and dissipation factor by reference to JIS C2565 at 10 GHz. Under a 10 GHz frequency, for a Dk value of less than or equal to 3.6 and a Df value of less than or equal to 0.004, a difference in Dk value after thermal aging of less than 0.05 represents no substantial difference in dielectric constant after thermal aging of different laminates, and a difference in Df value after thermal aging of less than 0.00005 represents no substantial difference in dissipation factor after thermal aging of different laminates; a difference in Dk value after thermal aging of greater than or equal to 0.05 represents a substantial difference (i.e., significant technical difficulty) in dielectric constant after thermal aging of different laminates, and a difference in Df value after thermal aging of greater than or equal to 0.00005 represents a substantial difference (i.e., significant technical difficulty) in dissipation factor after thermal aging of different laminates.

For example, articles made from the resin composition disclosed herein, as measured by reference to the aforesaid method at 10 GHz, have a dielectric constant after thermal aging of less than or equal to 3.41, such as between 3.15 and 3.41, and a dissipation factor after thermal aging of less than or equal to 0.00369, such as between 0.00275 and 0.00369.

3. Dielectric Constant Variation Rate (Dk Variation Rate) and Dissipation Factor Variation Rate (Df Variation Rate)

The dielectric constant variation rate (Dk variation rate) can be calculated as follow:

The dielectric constant variation rate={[dielectric constant after thermal aging−dielectric constant before thermal aging (i.e., the dielectric constant as described above in Item No. 1)]/dielectric constant before thermal aging}*100%

For example, articles made from the resin composition disclosed herein, as calculated by reference to the method above, have a dielectric constant variation rate of less than or equal to 0.29%, such as between −0.46% and 0.29%. Because the dielectric constant variation rate of 10% may be caused by the systematic error of the test equipment, it can be considered that the articles made from the resin composition disclosed herein do not significantly deteriorate the property about dielectric constant after thermal aging. Generally, a difference in the dielectric constant variation rate of greater than or equal to 1.5% represents a substantial difference (i.e., significant technical difficulty) in dielectric constant variation rate of different laminates.

In addition, the dissipation factor variation rate (Df variation rate) can be calculated as follow:

The dissipation factor variation rate={[dissipation factor after thermal aging−dissipation factor before thermal aging (i.e., the dissipation factor as described above in Item No. 1)]/dissipation factor before thermal aging}*100%

For example, articles made from the resin composition disclosed herein, as calculated by reference to the method above, have a dissipation factor variation rate of less than or equal to 86.53%, such as between 62.79% and 86.53%. Generally, a difference in the dissipation factor variation rate of greater than or equal to 92% represents a substantial difference (i.e., significant technical difficulty) in dissipation factor variation rate of different laminates.

4. Glass Transition Temperature (Tg)

The copper-free laminate sample (obtained by laminating eight prepregs) was subject to the glass transition temperature measurement. A thermal mechanical analyzer (TMA) was used by reference to the method described in IPC-TM-650 2.4.24.5, during which each sample was heated from 35° C. to 300° C. at a heating rate of 10° C./minute and then subject to the measurement of glass transition temperature (TMA Tg, in °C.). A higher glass transition temperature is more preferred, and a difference in glass transition temperature of greater than or equal to 5° C. represents a significant difference (i.e., significant technical difficulty) in glass transition temperature of different samples.

For example, articles made from the resin composition disclosed herein, as measured by reference to IPC-TM-650 2.4.24.4, have a glass transition temperature of greater than or equal to 170° C., such as between 170° C. and 190° C.

5. Copper Foil Peeling Strength (Peel Strength, P/S)

A copper-clad laminate (obtained by laminating eight prepregs) was cut into a rectangular specimen with a width of 24 mm and a length of greater than 60 mm, which was then etched to remove surface copper foil and leave a rectangular copper foil with a width of 3.18 mm and a length of greater than 60 mm. The specimen was tested by using a tensile strength tester by reference to IPC-TM-650 2.4.8 at ambient temperature (about 25° C.) to measure the force (lb/in) required to pull off the copper foil from the laminate surface. A higher copper foil peeling strength is more preferred, and a difference in copper foil peeling strength of greater than or equal to 0.1 lb/in represents a significant difference (i.e., significant technical difficulty) in copper foil peeling strength of different samples.

For example, articles made from the resin composition disclosed herein, as measured by reference to IPC-TM-650 2.4.8, have a copper foil peeling strength of greater than or equal to 3.00 lb/in, such as between 3.00 lb/in and 3.55 lb/in.

6. Copper Foil Peeling Strength after Thermal Treatment

A copper-clad laminate (obtained by laminating eight prepregs) was cut into a rectangular specimen with a width of 24 mm and a length of greater than 60 mm, which was then etched to remove surface copper foil and leave a rectangular copper foil with a width of 3.18 mm and a length of greater than 60 mm. Then, by reference to IPC-TM-650 2.6.27, the specimen was passed through a 260° C. reflow oven for a total of 5 cycles, followed by using a tensile strength tester by reference to IPC-TM-650 2.4.8 at ambient temperature (about 25° C.) to measure the force (lb/in) required to pull off the copper foil from the laminate surface. A higher copper foil peeling strength after thermal treatment is more preferred, and a difference in copper foil peeling strength after thermal treatment of greater than or equal to 0.1 lb/in represents a significant difference (i.e., significant technical difficulty) in copper foil peeling strength after thermal treatment of different samples.

For example, articles made from the resin composition disclosed herein, subject to thermal treatment by reference to IPC-TM-650 2.6.27 and then measured by reference to IPC-TM-650 2.4.8, have a copper foil peeling strength of greater than or equal to 3.00 lb/in, such as between 3.00 lb/in and 3.50 lb/in.

7. NaOH Alkali Resistance

The aforesaid copper-free laminate (formed by lamination of eight prepregs) was used as the specimen, which was cut into three pieces of test strip dimensioned 4 mm×2 mm, placed in a 105° C. oven and baked for 2 hours, and then soaked in a 90° C. 20% NaOH solution; with a 5-minute interval, the test strips were removed from the alkaline solution and visually inspected to determine the appearance of whitening or weave exposure, and the soaking time was recorded. The absence of whitening or weave exposure during the test means that the specimen has passed the alkali resistance test; the appearance of whitening or weave exposure during the test means that the specimen has failed the alkali resistance test, in which situation another specimen was made and test was performed again, during which the specimen was visually inspected with a 1-minute interval to determine the appearance of whitening or weave exposure and the soaking time was recorded; longer soaking time without whitening and weave exposure represents better NaOH alkali resistance.

For example, articles made from the resin composition disclosed herein, as measured by reference to the method described above, have an alkali resistance of greater than or equal to 4.0 minutes, such as between 4.0 minutes and 7.0 minutes.

8. Thermal Resistance after Moisture Absorption (PCT)

The copper-free laminate sample (obtained by laminating eight prepregs) was subject to pressure cooking test (PCT) by reference to IPC-TM-650 2.6.16.1 and 5 hours of moisture absorption (testing temperature of 121° C., relative humidity of 100%), and then by reference to IPC-TM-650 2.4.23, the sample after moisture absorption was immersed into a 288° C. solder bath for 20 seconds, removed and then inspected to determine the absence or presence of delamination, such as whether interlayer delamination or blistering occurs between insulation layers. Interlayer delamination or blistering may occur between any layers of the laminate. Three samples were sequentially tested. The test is failed if delamination was observed in at least one sample, and the test is passed if delamination was not observed in all three samples. Designation with one "X" represents that delamination was observed in one sample, and designation with one "O" represents that delamination was not observed in one sample. The test result of the three samples was recorded. For example, a result of "XXX" represents that delamination was observed in all three samples, and a result of "OOO" represents that delamination was not observed in all three samples.

For example, articles made from the resin composition disclosed herein are characterized by no delamination in a thermal resistance test after moisture absorption by reference to IPC-TM-650 2.6.16.1 and IPC-TM-650 2.4.23.

9. Time to Delamination

The copper-clad laminate sample (formed by lamination of eight prepregs), as measured by reference to IPC-TM-650 2.4.23, was clamped by a tester and immersed into a 288° C. solder bath. At the same time, use a stopwatch to start timing and inspect to determine the absence or presence of delamination, such as whether interlayer delamination or blistering occurs between a copper foil and an insulation layer and whether interlayer delamination or blistering occurs between insulation layers. Copper foil peeling may cause blistering and delamination between a copper foil and an insulation layer, and interlayer separation may cause blistering and delamination between any layers of the laminate. When delamination occurs, the tester will obviously feel the vibration of the sample; the timing is stopped immediately at this time, and the time to delamination is recorded. If delamination occurs within 15 minutes, the time to delamination is recorded as the value showed on the stopwatch; if no delamination occurs within 15 minutes, the time to delamination is recorded as greater than 15 minutes.

For example, articles made from the resin composition disclosed herein, subject to a time to delamination test as measured by reference to IPC-TM-650 2.4.23, have a time to delamination of greater than 15 minutes.

The following observations can be made from Table 1 to Table 5.

A side-by-side comparison of Examples E1, E4 and E5 and Comparative Examples C1-C2 indicates that by using 5-30 parts by weight of the maleimide resin disclosed herein, in contrast to using a maleimide resin not within the amount range above, the laminate made from the present disclosure can achieve at the same time one, more or all technical effects including increasing glass transition temperature, increasing copper foil peeling strength, increasing copper foil peeling strength after thermal treatment, passing the thermal resistance test after moisture absorption and having a time to delamination of greater than 15 minutes.

A side-by-side comparison of Examples E9-E19 and Comparative Examples C3-C4 indicates that by using 5-40 parts by weight of the active ester disclosed herein, in contrast to using an active ester not within the amount range above, the laminate made from the present disclosure can achieve at the same time one, more or all technical effects including lowering dissipation factor after thermal aging, lowering dielectric constant variation rate and dissipation factor variation rate, increasing glass transition temperature, increasing copper foil peeling strength, increasing copper foil peeling strength after thermal treatment, improving NaOH alkali resistance, passing the thermal resistance test after moisture absorption and having a time to delamination of greater than 15 minutes.

A side-by-side comparison of Examples E14-E17 and Comparative Examples C5-C6 indicates that by using 5-40 parts by weight of a phosphate ester, in contrast to using a phosphate ester not within the amount range above, the article made from the present disclosure can achieve at the same time one, more or all technical effects including lowering dissipation factor after thermal aging, lowering dielectric constant variation rate and dissipation factor variation rate, increasing glass transition temperature, increasing copper foil peeling strength after thermal treatment, improving NaOH alkali resistance, passing the thermal resistance test after moisture absorption and having a time to delamination of greater than 15 minutes.

A side-by-side comparison of Example E1 and Comparative Examples C7-C11 indicates that by using the phosphate ester disclosed herein, in contrast to using a different flame retardant, the laminate made from the present disclosure can achieve at the same time one, more or all technical effects including lowering dissipation factor, lowering dielectric constant after thermal aging, lowering dissipation factor after thermal aging, lowering dielectric constant variation rate, lowering dissipation factor variation rate, increasing copper foil peeling strength after thermal treatment, increasing NaOH alkali resistance, passing the thermal resistance test after moisture absorption and having a time to delamination of greater than 15 minutes.

A side-by-side comparison of Example E1 and Comparative Example $C_{12}$ indicates that the resin composition further added with epoxy resin may significantly deteriorate several properties of the laminate made from the present disclosure including dielectric constant, dissipation factor, dielectric constant after thermal aging, dissipation factor after thermal aging, dielectric constant variation rate, dissipation factor variation rate, copper foil peeling strength, copper foil peeling strength after thermal treatment and NaOH alkali resistance.

In addition, in the prior arts, the electrical properties were improved by adding a hydrogenated rubber to the resin composition. A side-by-side comparison of Example E12 and Comparative Example C13 (using 25 parts by weight of a hydrogenated rubber to replace an active ester and a phosphate ester) indicates that by using the active ester and the phosphate ester disclosed herein in combination, the laminate made from the present disclosure can achieve at the same time several technical effects including lowering dielectric constant variation rate, lowering dissipation factor variation rate, increasing glass transition temperature, increasing copper foil peeling strength, increasing copper foil peeling strength after thermal treatment and increasing NaOH alkali resistance, which demonstrates that the present disclosure can still improve the electrical properties by further adding a hydrogenated rubber.

A comparison of Examples E1-E21 and Comparative Examples C1-C13 indicates that by using the technical solution disclosed herein, the laminate made from the present disclosure can achieve at the same time one, more or all technical effects including a dissipation factor variation rate of less than or equal to 86.53%, a copper foil peeling strength after thermal treatment of greater than or equal to 3.00 lb/in, a dielectric constant variation rate of less than or equal to 0.29% and a time to delamination of greater than or equal to 15 minutes. In contrast, Comparative Examples C1-C13 not using the technical solution of the present disclosure fail to achieve the aforesaid technical effects at the same time.

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as more preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and all foreseeable equivalents at the time of filing this patent application.

What is claimed is:

1. A resin composition, comprising 100 parts by weight of a vinyl group-containing polyphenylene ether resin, 5 parts by weight to 30 parts by weight of a maleimide resin, 5 parts by weight to 40 parts by weight of an active ester and 5 parts by weight to 40 parts by weight of a phosphate ester, wherein the resin composition does not comprise an epoxy resin, and wherein the active ester has a structure as shown below

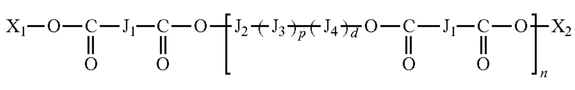

wherein $X_1$ and $X_2$ are each independently a phenyl group or a naphthyl group; $J_1$, $J_2$ and $J_4$ are each independently an unsubstituted arylene group or an substituted arylene group; $J_3$ is an cycloalkylene group; p and d are each independently 0 or 1; and n is an integer of 1 to 30.

2. The resin composition of claim 1, wherein the vinyl group-containing polyphenylene ether resin comprises a vinylbenzyl group-terminated polyphenylene ether resin, a methacrylate group-terminated polyphenylene ether resin, an allyl group-terminated polyphenylene ether resin or a combination thereof.

3. The resin composition of claim 1, wherein the maleimide resin comprises 4,4'-diphenylmethane bismaleimide, polyphenylmethane maleimide, 2,2'-bis-[4-(4-maleimidephenoxy)phenyl]propane, m-phenylene bismaleimide, bisphenol A diphenyl ether bismaleimide, 3,3'-dimethyl-5,5'-diethyl-4,4'-diphenyl methane bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenylmaleimide, maleimide resin containing aliphatic long-chain structure or a combination thereof.

4. The resin composition of claim 1, wherein the phosphate ester comprises resorcinol bis-(diphenyl phosphate), hydroquinone bis-(dixylenyl phosphate), bisphenol A bis-(diphenyl phosphate), resorcinol bis-(dixylenyl phosphate), biphenol bis-(dixylenyl phosphate) or a combination thereof.

5. The resin composition of claim 1, further comprising a maleimide triazine resin, an unsaturated polyolefin resin, a hydrogenated unsaturated polyolefin resin, a small molecule vinyl group-containing resin, a styrene maleic anhydride resin, a phenolic resin, a benzoxazine resin, a cyanate ester resin, a polyamide resin, a polyimide resin or a combination thereof.

6. The resin composition of claim 1, further comprising amine curing agent, inorganic filler, curing accelerator, polymerization inhibitor, coloring agent, solvent, toughening agent, silane coupling agent or a combination thereof.

7. An article made from the resin composition of claim 1, wherein the article comprises a prepreg, a resin film, a laminate, or a printed circuit board.

8. The article of claim 7, having a dissipation factor at 10 GHz as measured by reference to JIS C2565 of less than or equal to 0.00210.

9. The article of claim 7, having a dissipation factor at 10 GHz as measured by reference to JIS C2565 after being subject to 96 hours of aging at 188° C. of less than or equal to 0.00369.

10. The article of claim 7, having a dissipation factor variation rate at 10 GHz as calculated after being subject to 96 hours of aging at 188° C. of less than or equal to 86.53%.

11. The article of claim 7, having a copper foil peeling strength as measured by reference to IPC-TM-650 2.4.8 of greater than or equal to 3.00 lb/in after thermal treatment performed by reference to IPC-TM-650 2.6.27.

12. The article of claim 7, having an alkali resistance as measured from an NaOH alkali resistance test of greater than or equal to 4.0 minutes.

* * * * *